United States Patent [19]

Bikson et al.

[11] Patent Number: 4,877,421

[45] Date of Patent: Oct. 31, 1989

[54] TREATMENT OF PERMEABLE MEMBRANES

[75] Inventors: Benjamin Bikson, Brookline; Salvatore Giglia, Norwood, both of Mass.

[73] Assignee: Union Carbide Corporation, Danbury, Conn.

[21] Appl. No.: 115,927

[22] Filed: Nov. 2, 1987

[51] Int. Cl.$^4$ .............................................. B01D 53/22
[52] U.S. Cl. ............................................ 55/16; 55/158
[58] Field of Search ............................. 55/16, 68, 158; 210/636

[56] References Cited

U.S. PATENT DOCUMENTS

| | | | |
|---|---|---|---|
| 3,808,303 | 4/1974 | Ganci et al. | 264/41 |
| 3,822,202 | 7/1974 | Hoehn | 55/16 |
| 3,842,515 | 10/1974 | MacDonald et al. | 55/16 X |
| 3,853,755 | 12/1974 | Ganci | 210/490 X |
| 3,886,066 | 5/1975 | Chen et al. | 210/500.27 X |
| 4,127,625 | 11/1978 | Arisaka et al. | 55/158 X |
| 4,243,701 | 1/1981 | Riley et al. | 55/158 X |
| 4,512,893 | 4/1985 | Makino et al. | 55/158 X |
| 4,527,999 | 7/1985 | Lee | 55/16 |

FOREIGN PATENT DOCUMENTS

| | | | |
|---|---|---|---|
| 15491 | 2/1977 | Japan | 55/158 |
| 166208 | 9/1984 | Japan | 55/158 |
| 807 | 1/1985 | Japan | 55/158 |
| 18402 | 1/1986 | Japan | 55/158 |
| 57239 | 3/1986 | Japan | 55/158 |
| 345717 | 6/1979 | U.S.S.R. | 55/158 |

OTHER PUBLICATIONS

"Reverse Osmosis Membrane Regeneration", Office of Saline Water R&D Report #471, (10/9/69) pp. 1, 2, 34, 37 and 54–59.

G. L. Dalton; Supplemental Polymer Coatings in Reverse Membrane Improvement and Regeneration; Desalination, 24 (1978); 235–248.

D. B. Guy et al; On-Site Regeneration of Reverse Osmosis Membranes, WSIA Journal, Jan. 1982, vol. 9, No. 1, 35–43.

Goodrich Publications re MT and AF Products.
Pfizer Publication re Flocon Products.

*Primary Examiner*—Robert Spitzer
*Attorney, Agent, or Firm*—Alvin H. Fritschler

[57] ABSTRACT

A method for enhancing the long term performance of gas separation membranes. The permeable membranes are heated at a moderate temperature of from about 50° C. to 140° C. Use of this method enables restoration and reclamation of permeable membranes that have suffered degradation in performance in gas separation processes.

16 Claims, 1 Drawing Sheet

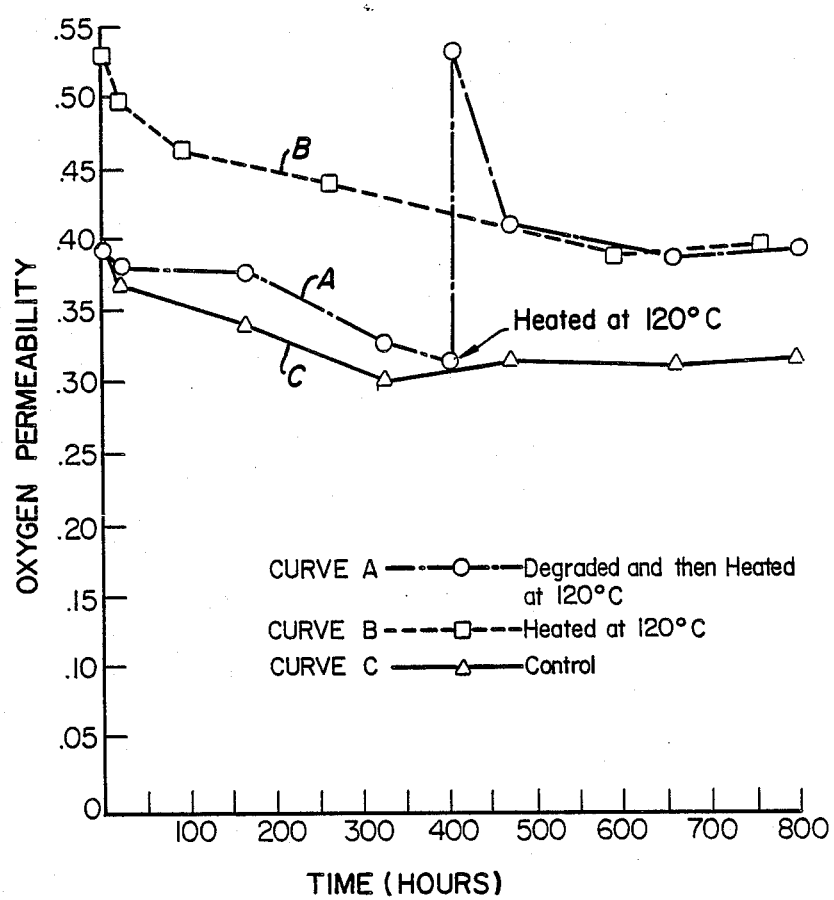

TREATMENT OF PERMEABLE MEMBRANES

FIELD OF THE INVENTION

This invention relates to a novel method for increasing the long term performance of gas separation membranes. More particularly, it pertains to the production of permeable hollow fiber membranes having increased permeability in long term gas separation operations and the restoration of permeation properties of the membranes which have suffered a degradation in performance due to impurities carried over in the feed stream.

DESCRIPTION OF THE PRIOR ART

Permeable membranes capable of selectively permeating one component of a gas mixture are considered in the art as a convenient, potentially highly advantageous means for achieving desirable gas separations. For practical commercial operations, permeable membranes must be capable of achieving an acceptable level of selectivity of separation of the gaseous components contained in a feed stream while at the same time achieving a desirably high productivity of separation and stability. However, the continued use of a membrane system is affected by impurities carried by the feed stream and degradation in performance of the membranes results. Any solution to this problem is of considerable commercial importance.

Various types of permeable membranes have been proposed in the art for the carrying out of a variety of gas separation operations. Such membranes can generally be classified as being of the (1) isotropic, (2) asymmetric or (3) composite type. The so-called isotropic and asymmetric type membranes are comprised essentially of a single permeable membrane material capable of selectively separating desired components of a gas mixture. Isotropic membranes have the same density throughout the thickness thereof. Such membranes generally have the disadvantage of low permeability, i.e. low permeate flux, due to the relatively high membrane thickness necessarily associated therewith. Asymmetric membranes are distinguished by the existence of two distinct morphological regions within the membrane structure. One such region comprises a thin, dense semi permeable skin capable of selectively permeating one component of a gas mixture, and the other region comprises a less dense, porous, non-selective support region that serves to preclude the collapse of the thin skin region of the membrane under pressure. Composite membranes generally comprise a thin layer or coating of a suitable permeable membrane material superimposed on a porous substrate. The thin permeable membrane separation layer, which determines the separation characteristics of the composite structure, is advantageously very thin so as to provide the desirably high permeability referred to above. The substrate only serves to provide a support for the thin membrane layer positioned thereon. Regardless of the type of membrane, all suffer degradation during use which affects their gas permeability and/or loss of selectivity.

As the advantages of permeable membranes have become increasingly appreciated in the art, the performance requirements of such membranes have likewise increased. Thus, the art is moving in the direction of very thin membranes that will yield an increase in permeability characteristics without sacrifice of the separation, or selectivity, characteristics. It is thus increasingly desired that more advantageous combinations of higher permeability and selectivity over a longer period be achieved with respect to a variety of gas separations of commercial interest. It is also desired to advance and improve the methods employed for producing membranes having increased gas permeability without loss of selectivity and to restore the permeation properties of membranes that have suffered a degradation in performance due to impurities carried by the feed stream.

Though the isotropic type membranes are not generally suitable for the achieving of gas separation requirements, asymmetric membranes, on the other hand, have been developed for practical gas separation applications, but in many instances do not possess an inherent flexibility enabling them to be readily optimized for particular gas separation applications. While the thin dense, semi-permeable layer of a particular asymmetric membrane material can be made thinner for increased permeability, the selectivity characteristics of said material, unless modified by particular treatment techniques, may be no more than adequate with respect to the separation of the components of the gas being treated in the particular application.

The thin skin of such asymmetric membranes, which are described in the Loeb U.S. Pat. No. 3,133,132, is frequently found not to be perfect, but to contain various defects. Such defects, in the form of residual pores, minute pinholes and the like, comprise relatively large size openings through which the feed gas passed to a membrane of such material will preferentially flow. As a result, a significantly reduced amount of gas separation due to the interaction of the feed gas with the material of the permeation membrane itself will occur because of the presence of such defects in the membrane structure. In the case of asymmetric polysulfone hollow fibers, such defects result in the selectivity (as defined below) being from about 1 to 1.5 for air as contrasted to a selectivity of about 6.0 for polysulfone that is free of defects. In a proposed solution to this problem, Henis et al., U.S. Pat. No. 4,230,463, disclosed the coating of the asymmetric membrane with a coating material having a determined intrinsic separation factor that is less than that of the material of the separation membrane. The coating procedures used by Henis et al. are described in Table XVI in columns 51 and 52 of U.S. Pat. No. 4,230,463. They involve dipping the porous hollow fiber membrane in a liquid coating material, undiluted or diluted with solvent, and allowing the excess liquid coating material to drip off; in those instances in which a solvent was present it was allowed to evaporate off. Using this approach, silicone, having a selectivity for air of about 2, was coated on polysulfone hollow fibers to increase the selectivity thereof from the 1 to 1.5 range indicated above to from 2 to 6, with such selectivity commonly approaching 6. The permeability (as defined below) of such silicone/polysulfone composites has generally been relatively low, i.e. about 0.2 ft$^3$(STP)/ft$^2$ ·psi·day or less, leading to the desire for thinner membranes, i.e. thinner dense skins, particularly in light of the increasing requirements in the art for high flux operation. Thinner membranes lead, however, to an increase in the number of defects that require repair to achieve acceptable performance. While efforts to improve this approach continue, there remains a desire in the art for other approaches to provide a desirable combination of selectivity and permeability as well as longer life for practical commercial operation. For such reasons, composite membranes, utilizing membrane materials selected particularly for a desired gas separation, offer the greatest opportunity, with respect to particular gas separations of commercial interest, for the achieving of desirable combinations of selectivity and permeability. It will be appreciated that composite membranes, to achieve the performance requirements desired in the art, must not only incorporate very thin membrane layers, but must comprise separation layer-substrate structures of optimum advantage for a desired gas separation operation. One such application of significant commercial interest is air separation, particularly wherein the membrane material selectively permeates oxygen for recovery as an oxygen enriched permeate gas, with a nitrogen-enriched stream being withdrawn as non permeate gas. There is a genuine need and desire in the art, therefore, to develop composite-type membranes particularly suitable for air separation and other desirable gas separation operations such as the recovery of hydrogen from ammonia purge gas and from refinery gas streams, and carbon dioxide and methane separations in various operations such as tertiary oil recovery.

A large number of semi-permeable membranes of a variety of materials and forms have been proposed in the art for carrying out such separations. So-called composite membranes have been proposed wherein a thin layer of a suitable semi-permeable membrane material is superimposed on a relatively porous substrate. The separation layer is advantageously very thin in order to provide the desirably high flux referred to above. The substrate provides support for the delicate, very thin permeable membrane layer or coating superimposed thereon. Such composite membrane structures re described in the Salemme et al. U.S. Pat. No. 4,155,793 and in the Klass et al. U.S. Pat. No. 3,616,607.

It will be appreciated that membranes for permeation separation processes for gas feeds, require membranes possessing a high degree of perfection in the membrane, or separation, layer. In gas separation processes, pervaporation, perstruction and the like, the best results would obviously be obtained if the membrane layer were free of any residual pores or other imperfections and clear of impurities. On the other hand, the membrane layer needs to be made as thin and uniform as possible in order to attain desirably high permeation rates, and thus high overall separation process productivity. In such circumstances, the presence of morphological imperfections are frequently found to occur in the thin separation layer of membrane assemblies in the form of residual pores, minute pinholes and the like. Such imperfections can be introduced into the membrane system in the course of the various typical membrane manufacturing steps, such as spinning, casting, coating, curing and membrane module manufacturing operations and impurities can be introduced with the feed stream during use.

To overcome the problem of defects the Browall U.S. Pat. No. 3,980,456, has disclosed the application of a second, sealing coating over the very thin membrane to cover defects caused by particulate impurities. Such treated composite structures are complex in nature and, moreover, the use of a superimposed very thin membrane on a porous support substrate has not generally provided the desired selectivity of separation without an unacceptable reduction in the flux, or permeability, of the permeate gas.

In the Ward, et al. U.S. Pat. No. 4,214,020, a process is disclosed that teaches coating the exterior surface of a hollow fiber membrane assembly by immersing a bundle of hollow fibers into a coating solution, and driving the coating solution into the fiber by applying pressure from the exterior to the interior of the hollow fibers. This process, leading to the formation of a continuous layer/coating on the exterior of the hollow fibers, is particularly useful in the preparation of highly selective gas separation membranes by the coating of asymmetric membranes having some residual porosity with coating solutions of materials highly permeable to gases, as described in the Henis et al. patent referred to above.

In the Arisaka, et al. U.S. Pat. No. 4,127,625, a process is disclosed for producing, asymmetric hollow fibers by spinning a dope of a fiber forming resin through the outer tube of a double tube type spinneret into an aqueous coagulating bath to form a hollow fiber and simultaneously injecting an aqueous liquid through the inner tube of the spinneret to contact the interior of the hollow fiber. This is followed by dipping in warm water and drying.

In the Riley, et al. U.S. Pat. No. 4,243,701, there is disclosed a process for forming a thin film of a non porous permeable membrane on the surface of a porous support by passing the porous support through a solution of a halogenated hydrocarbon solvent containing the permeable membrane forming prepolymer and a crosslinking agent, withdrawing the coated porous support from the solution, and then crosslinking the prepolymer at elevated temperature to form the composite membrane.

In the Coplan, et al. U.S. Pat. No. 4,467,001, there is disclosed a method and apparatus for coating, drying and curing multiple filaments. The liquid coating is applied to the filament in a "U" shaped tube and drying and curing are performed in a gaseous atmosphere.

One should also consider the molecular sieve carbon membranes that are described by J. E. Koresh and A. Sofer in Separation Science and Technology, 18(8), pp. 723–734, 1983 and in Mechanism of Permeation Through Molecular-sieve Carbon Membrane, J. Chem. Soc. Faraday Trans. 1, 1986, 82, 2057–2063.

In U.S. Pat. No. 3,822,202, issued to H. H. Hoehn on July 2, 1974, there is described a process for initially heat treating polyimide, polyamide and polyester polymers at elevated temperatures of at least 150° C. and as high as 340° C. or greater under vacuum. There are 33 examples, which contain 111 experiments performed in accord with the claimed invention, all of which were carried out under vacuum at temperatures from 150° C. to 340° C. over periods of time ranging from one minute to 6 hours. There is no indication in the patent that one can restore the permeability of a used membrane at a lower temperature.

In an article by G. L. Dalton entitled "Supplemental Polymer Coatings in Reverse Osmosis Membrane Improvement and Regeneration", Desalination, 24 (1978) 235–248, a procedure is described for treating substandard or degenerated cellulose acetate membranes used in aqueous separation processes with water soluble polymers that are subsequently insolubilized. The procedure requires treatment of the membrane with an aqueous solution of the water soluble polymer. On page 236 the author states that although heat treatment has been used to restore salt rejection properties in aqueous solution separations, this system or technique does not lend itself readily to application in the field. On the contrary, the process described by the inventors of this patent application has been found suitable for use.

The technique of treating membranes used in separation of liquids with various additives to improve or restore their performance properties is not unique and has been disclosed by many. In U.S. Pat. No. 3,808,303, issued to J. B. Ganci et al. on Apr. 30, 1974, ethers (or water) having a formula weight greater than 400 were applied from aqueous solutions at 50° C. to 90° C. until the reverse osmosis membrane had absorbed an effective amount of the treating agent. In U.S. Pat. No. 3,853,755, issued to J. B. Ganci on Dec. 10, 1974, the fouled reverse osmosis membranes were treated with solutions of hydrolyzable tannins at 10° C. to 90° C. In U.S. Pat. No. 3,886,066, issued to C. Chen et al. on May 27, 1975, non porous semipermeable membranes were contacted with solutions of hydrolyzable tannins having a pH of 1.5 to 6 at 0° C. to 100° C. to cause initial reduction in solute passage through the membrane. In an article entitle "On Site Regeneration of Reverse Osmosis Membranes", D. B. Guy et al., WSIA Journal, January 1982, Vol. 9, No. 1, pages 35 to 43, a multiplicity of materials were tested to treat the membranes. In all instances the procedure involved application of a chemical to the membrane. Similar techniques were employed and disclosed in two publications involving the MT and A F products by Goodwill and one involving the FLOCON product by Pfizer for cleaning and treating membranes by means of various chemical reagents. In all of these instances the procedure involved the use of one or more chemical reagents to treat the membrane.

Regardless of how the membrane is produced, all permeable membranes may suffer degradation during use, particularly with gas feeds that are not pretreated to remove traces of volatile contaminants such as lubricants and compressor oil vapors or other impurities, and many attempts are made to restore activity to some higher degree. To date, however, no process has shown a commercially acceptable and practical way to economically and effectively restore the permeability and/or selectivity properties of a degraded permeable membrane to at least essentially the original properties of a new membrane module. None of the references discussed above suggest or disclose such restoration under relatively mild conditions. In the past some restoration attempts have been made but none have been fully successful and the usual practice has been to discard a membrane module and replace it with a new module when the permeability and/or selectivity are no longer within an acceptable level.

SUMMARY OF THE INVENTION

A method for increasing the long term permeation performance and/or restoring the permeability rate and/or selectivity of hollow fiber permeable membranes by heating a permeable membrane under relatively mild conditions. The method is applicable to hollow fibers, spiral wound or any other desired configuration of the permeable membrane.

DETAILED DESCRIPTION OF THE INVENTION

This invention provides a process for increasing the long term permeation performance and/or restoring, without loss of selectivity, the permeability of gas separation membranes. The method is applicable to the treatment of both new and used gas separation membranes that are employed to selectively separate components in a fluid mixture. Permeable membranes are used to separate components in gaseous compositions, e.g., selective separation of the gases, such as in air. The process of this invention can be used not only to prolong the permeation performance but also to restore the permeability of semipermeable membrane useful for gas separation process.

Though the literature makes mention of washing and chemical treating procedures for restoring permeability properties of permeable membranes for the separation of gases, to the best of our knowledge it does not contain any recognition or mention to the process of the invention described and claimed herein for the separation of gases. This invention not only produces a permeable membrane having initial higher permeability and/or selectivity properties in gas separations but it also permits the restoration under relatively mild conditions of the permeability and/or selectivity properties of membranes that have suffered degradation of such properties during use, without deleterious effect on the membrane. This is a significant commercial advantage since it will no longer be necessary to discard the membranes or membrane modules as frequently as has been done, materials that are generally quite costly, but to restore their permeability and/or selectivity properties to essentially their initial values, or even to higher than their initial values. It was completely unexpected and unpredictable that this could be accomplished under the relatively mild conditions disclosed herein.

Due to the very thin structure of the permeable layer of the membranes used in gas separations, the deposition of any minute amount of impurities in the gas feed stream during a period of use on the surface of the membrane will cause degradation of permeability and/or selectivity properties. The heating causes removal or desorption from the membranes surface of impurities such as condensed hydrocarbon vapor contaminants carried by the feed stream.

The permeable membranes can be heated individually or as a module assembly, these terms being understood and known to one of average skill in the art. The heating can be done under dry or wet conditions depending upon the particular membrane system undergoing treatment. The temperature can be from about 80° C. to about 140° C., preferably from about 100° C. to about 125° C. Any elevated temperature above 80° C. in this range can be used provided it does not destroy the porous support or the permeable membrane. In some instances the use of vacuum in conjunction with heating, as above, and/or purging with an inert gas, e.g., nitrogen, is beneficial. The use of vacuum alone is not effective. As is apparent to one of ordinary skill in the art the various polymers used as the membranes have different temperatures at which they may be damaged, thus in light of the teachings herein such destructive temperatures are to be avoided.

Since many commercial processes employ hollow fiber permeable membrane module assemblies having polymer encapsulated terminals at each end, these are preferably treated by the process of this invention by heating in an oven or by passing a stream of heated gas through the module. In this manner the contaminants or impurities are driven off. In those instances in which a new module is initially treated heating the module or membrane as stated above is generally sufficient to increase the initial permeability and increase the long term permeation performance of the membrane. The production of hollow fiber permeable membrane modules is well known to one of ordinary skill in this art and requires no further description since it is fully documented in available publications. In this regard attention is directed to U.S. Pat. Nos. 3,442,002, 3,499,062, 4,207,192 and 4,631,128.

The drawing graphically illustrates the unexpected and unpredictable results achieved by the process of this invention. The data in this figure derives from Comparative Experiment I and Examples 1 and 2 and involves the separation of the gases in air at a pressure of 100 psig and a temperature of 25° C. In all instances the selectivity for oxygen separation between oxygen and nitrogen was about 3.8.

Curve A in the drawing, based on Example 1, shows the degradation in permeability of a hollow fiber membrane module that did not undergo initial heating by the process of this invention. As can be seen, the initial oxygen permeability rate was about 0.39 ft$^3$(STP)/ft$^2$·psi·day. After 400 hours of operation this had decreased to a permeability rate of about 0.32 ft$^3$(STP)/ft$^2$·psi·day. At this stage the permeability of the module was restored by heating in a circulating air oven at a temperature of 120° C. for one hour. After the module was cooled to ambient temperature air separation was resumed. Immediately after the treatment and upon resumption of air separation through the module, the oxygen permeability had dramatically and unexpectedly increased to about 0.54 ft$^3$(STP)/ft$^2$·psi·day, a value almost 40% higher than the initial oxygen permeation rate. This rate declined over a period of time and stabilized at about 0.4 ft$^3$(STP)/ft$^2$·psi·day. It is important to note that after treatment permeability stabilized at a rate equal to or slightly above the initial permeability of the untreated module.

Curve B in the drawing, based on Example 2, shows the results of initial heating of a module of hollow fiber permeable membranes at 120° C. for one hour in the same manner as the module used in the experiment portrayed in Curve A. In this instance the initial oxygen permeability of the heat-treated module was about 0.53 ft$^3$(STP)/ft$^2$·psi·day, a value considerably higher than that of either Curve A or Curve C. The permeability gradually declined and became stable at about 0.4 ft3(STP)/ft$^2$·psi·day. It is important to note that permeability stabilized at about the same value both when the module was heated to enhance the initial permeability (Curve B) and when the module was heated to restore the permeability (Curve A).

Curve C in the drawing, based on the Comparative Experiment I, shows the permeability performance of a membrane module that was not subjected to the process of this invention at any time. This corresponds to current conventional practice. In this instance the initial oxygen permeability was about 0.39 ft$^3$(STP)/ft$^2$·psi·day. After about 325 hours of operation the oxygen permeability had declined to about 0.3; it thereafter stabilized at about 0.33 ft$^3$(STP)/ft$^2$·psi·day. It is to be noted that in both instances in which the modules had been treated, either initially to enhance permeability or later to restore permeability, the oxygen permeability stabilized at a considerably higher value of about 0.4 ft$^3$ (STP)/ft$^2$·psi·day as compared to a stabilized value of about 0.33 ft$^3$(STP)/ft$^2$·psi·day for that module that had not been treated.

In accordance with this invention a module of permeable membranes is prepared in the conventional manner known to those skilled in the art. The preparation of such modules is not a part of this invention and any of the known procedures for their preparation, including the encapsulation procedures used in such preparations, can be employed. After the modules have been prepared, they can be initially treated by the process of this invention. This involves heating the module at a temperature of from about 50° C. to about 140° .C, preferably from about 80° C. to about 140° C., and more preferably from about 100° C. to about 125° C. for a period of from about 0.5 hour to about 3 hours, preferably about 1 hour. The temperature and time are such that the module is not deleteriously affected; it should not be overheated to the extent that the membranes and/or the encapsulating polymer are damaged or destroyed. Thus, the proper temperature within the above range must be selected depending upon the particular polymers present in the module and the pressure used. Knowing which polymers are present, one skilled in the art knows which temperature and pressure can be used without causing damage to the membrane.

The membranes can be heated at atmospheric pressure, or at subatmospheric or superatmospheric pressure. Any pressure can be used that does not damage the membrane during the heat treatment.

Heating can be effected in any convenient manner, e.g., in a heated oven, with or without circulation; with steam; with hot gas; with microwave or infrared heat means; or any other convenient procedure.

In those instances in which a module has been in use and has suffered degradation in permeability and/or selectivity, the module is restored in the same manner as one would treat a new module.

The invention is further described herein, for convenience of description, with particular reference to hollow fiber or polysulfone hollow fiber composite membranes. It will be understood, however, the scope of the invention is not limited to the use of asymetric, composite or porous molecular sieve type membranes in hollow fiber form. It is within the scope of the invention to employ any permeable membrane composition that is treated as herein described for use in desired gas separation operations. In addition, such permeable membranes can be prepared, in accordance with this invention, in spiral wound, flat sheet, or other desired configuration as well as in said hollow fiber form. Those skilled in the art are aware of the many methods available for their production and their ready commercial availability. The hollow fibers, e.g. prepared as disclosed by J. Cabasso and A. P. Tamrakis, "Composite Hollow Fiber Membranes", J. App. Polym. Sci., 23, 15091525 (1979), have continuous channels for fluid flow extending between the exterior and interior surfaces. Frequently, the pores have an average cross-sectional diameter less than about 20,000 angstroms and in some hollow fibers the cross-sectional diameter is less than about 1,000 or 5,000 angstroms. Particularly advantageous hollow fibers, especially for gas separations wherein the material of the hollow fiber effects a significant portion of the separation, such as disclosed by Henis, et al., in the above-recited patent, the average pore cross-sectional diameter is about 5 to 200 angstroms. Often the ratio of total surface area to total pore cross sectional area of the hollow fiber is at least about 10:1. For membranes for gas separations, especially in those membranes in which a significant portion of the separation is effected by the material of the hollow fiber, the ratio of total surface area to total pore cross-sectional area of the hollow fiber is at least about $10^3$:1, and some hollow fibers may have ratios of about $10^3$:1 to $10^8$:1.

Advantageously, the walls of the hollow fibers are sufficiently thick that no special apparatus is required for their handling. Frequently, the hollow fibers may have outside diameters of about 20 to 1,000 microns, say, about 50 to 1,000 microns, e.g., about 250 to 1,000 microns, and have walls of at least about 5 microns in thickness. The wall thickness in some hollow fibers may be up to about 200 or 300 microns. In order to provide desirable fluxes through the hollow fibers, particularly using those hollow fibers having walls at least about 50 microns in thickness, the hollow fibers may have a substantial void volume. Voids are regions within the walls of the hollow fibers which are vacant of the material of the hollow fibers. Thus, when voids are present, the density of the hollow fiber is less than the density of the bulk material of the hollow fiber. Often, when voids are desired, the void volume of the hollow fibers is up to about 90, say, about 10 to 80, and sometimes about 20 or 30 to 70, percent based on the superficial volume, i.e., the volume contained within the gross dimensions, of the hollow fiber. In addition to contaminants normally present in a gas feed, another source of contamination is the lubricant used in the pumps and other equipment that is carried to the membranes by the gas feed stream.

The material used for the hollow fiber may be a solid natural or synthetic substance, organic or inorganic. The selection of the material for the hollow fiber may be based on the heat resistance, solvent resistance, and/or mechanical strength of the hollow fiber, as well as other factors dictated by the intended separation process in which it will be used and the operating conditions to which it will be subjected. Thus, for instance, the selection of the material of the hollow fiber may be based on whether or not the material of the hollow fiber is intended to significantly effect the fluid separation, in which event the material of the hollow fiber has useful separation properties, or whether the coating is intended to effect the fluid separation. The hollow fibers may be flexible or substantially rigid. The material used for the hollow fibers may be inorganic, e.g., hollow glass, ceramic, sintered metal, or the like, fibers. In the case of polymers, both addition and condensation polymers which can be fabricated in any suitable manner to provide porous hollow fibers are included. Generally organic, or organic polymers mixed with inorganic materials (e.g., fillers), are used to prepare the hollow fibers. Typical polymers can be substituted or unsubstituted polymers and may be selected from polysulfones; poly(styrenes), including styrene containing copolymers such as acrylonitrile-styrene copolymers, styrene-butadiene copolymers and styrene-vinylbenzylhalide copolymers; polycarbonates; cellulosic polymers, such as cellulose, cellulose acetate; cellulose acetate-butyrate, cellulose propionate, methyl cellulose, nitrocellulose, etc.; polyamides and polyimides, including aryl polyamides and aryl polyimides; polyethers; poly(arylene oxides) such as poly(phenylene oxide);poly(esteramidedisocyanate); polyurethanes; polyesters (including polyarylates), such as poly(ethylene terephthalate), poly (alkyl methacrylates), poly(alkyl acrylates), poly(phenylene terephthalate), etc.; polysulfides; polymers from monomers having alpha-olefinic unsaturation other than mentioned above such as poly(ethylene), poly(propylene), poly(butene 1), poly(4 methyl pentene 1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate); poly- phosphazines; etc. The preparation of hollow fibers is well known to those of ordinary skill in the art.

The thin membrane separation layer or membrane forming material deposited on the porous substrate is generally applied as a solution in a suitable solvent or can be formed by in situ polymerization. Those skilled in the art appreciate that many such materials are available and that some exhibit selectivities to some gas mixtures and not to others. This is of no consequence to this invention since the process of this invention is directed to increasing the long term permeability performance of membranes.

Typical of the useful membrane forming materials are polymers which can be substituted or unsubstituted. The materials include synthetic rubbers; natural rubbers; relatively high molecular weight and/or high boiling liquids; organic prepolymers; poly(siloxanes) (silicone polymers); polysilazanes; polyurethanes; poly(epichlorhydrin); polyamines; polyimines; polyamides; acrylonitrile containing copolymers such as poly(α-chloroacrylonitrile) copolymers; polyesters (including polylactams and polyarylates), e.g., poly(alkyl acrylates) and poly(alkyl methacrylates), polysuccinates, and alkyd resins; cellulosic polymers; polysulfones, especially aliphatic-containing polysulfones; poly(alkylene glycols) such as poly(ethylene glycol), poly(propylene glycol), etc.,; polymers from monomers having α-olefinic unsaturation such as poly(olefins), e.g., poly(ethylene), poly(propylene), poly(butadiene), poly (2,3-dichlorobutadiene),poly(chloroprene), poly(styrene) including poly(styrene) copolymers, e.g., styrene butadiene copolymer, polyvinyls such as poly(vinyl alcohols), poly(vinyl aldehydes) (e.g., poly(vinyl formal) and poly(vinyl butyral), poly(vinyl ketones) (e.g. poly(methyl vinyl ketone)), poly(vinyl esters) (e.g., poly(vinyl benzoate)), poly(vinyl halides), poly(vinylidene halides),; fluorinated ethylene copolymers; poly(arylene oxides), e.g., poly(xylylene oxide); polycarbonates; and the like, and any interpolymers including block interpolymers containing repeating units from the above, and grafts and blends containing any of the foregoing, and monomers of the above mentioned polymers. Suitable solvents include normally liquid alkanes, e.g., pentane, cyclohexane, etc.; aliphatic alcohols, e.g., methanol; some halogenated alkanes and halogenated dialkyl ethers; and dialkyl ethers; and the like; and mixtures thereof.

As indicated previously, the membrane forming material is applied to the surface of the porous substrate from a solution. This is generally performed by passing or immersing the porous substrate surface through the solution. It is to be understood that the porous substrate can be either dry or prewetted with a liquid which is compatible with the solvent used in preparing the membrane forming solution. Any suitable solvent or mixture of solvents for the membrane-forming material can be used and those skilled in the art appreciate and know which solvent is suitable for a particular membrane-forming material. The solvent is one which will dissolve the membrane-forming material and can be inorganic or organic and able to produce a homogeneous or uniform solution. The solvents are then removed either by evaporative drying or in a liquid bath, which optionally can contain a coagulant for the membrane-forming component.

The following description represents one means of carrying out the process of this invention. It is apparent that this is not the only manner of doing so and should not be construed thusly; also, for convenience of description porous hollow fibers are employed that have been coated with the membrane-forming material to produce the hollow fiber composite membrane. The thin membrane applied to the surface of the porous hollow fiber substrate generally has a thickness of from about 300 to about 7,000 Angstroms, preferably from about 500 to about 2,000 Angstroms.

The hollow fiber composite membrane is used to form a module, the ends encapsulated in solid polymer by conventional procedures to separate the high pressure side of the module from the low pressure side and make it useful for gas separation procedures. As now discovered by this invention, the module is heated at a temperature as hereinbefore described before its use in gas separation. This initial heat treating process has in some instances been found to increase the long term permeability performance as compared to a like module that has not been subjected to the heat treatment process of this invention. Alternatively, the module can initially be used in a gas separation process without undergoing the heat treatment process of this invention and subsequently, after the module has degraded as shown by reduced permeability, the degraded module is subjected to the heat treatment process of this invention and the selectivity and/or permeability restored to a value equal to or above the initial value of the module. Thereafter these values generally remain at higher levels than observed with the module when it was initially placed into operation before it had been heat treated by the process of this invention.

The subsequent treatment by the process of this invention can be performed on the module whether or not it had been initially heat treated and can be repeated until the hollow fiber composite membrane fails to respond to the process, which will vary with the particular product.

As used herein, it will be understood that selectivity, or separation factor, of a membrane or membrane assembly represents the ratio of the permeate rate of the more permeable to the less permeable component of the mixture being separated and the average permeability is reported expressed in $ft^3(STP)/ft^2 \cdot psi \cdot day$.

A large batch of polysulfone hollow fiber substrates for use in the practice of the particular embodiments of this invention can by prepared in accordance with conventional techniques well known in the art. Hollow fibers are generally spun from a dope composition of the desired fiber polymer, quenched and washed. As disclosed by Cabasso et al. in "Composite Hollow Fiber Membranes", Journal of Applied Polymer Science, Vol. 23, 1509–1525 (1979), polysulfone hollow fibers are spun from a ternary solution of polysulfone, poly(vinylpyrrolidone) and dimethylacetamide, with the total polymeric concentration in the solution desirably being 40–52 wt. %, and the polysulfone/poly(vinylpyrrolidone) ratio being 1.5–2.0. The well known tube in tube jet technique was used in the spinning procedure, with water at about 21° C. being the outside quench medium for the fibers. The quench medium in the center of the fiber was air. Quenching was followed by washing the fibers at about 50°–60° C. Following such washing, the hollow fibers were dried prior to being coated with the membrane material to form the desired composite membrane. For this purpose, the polysulfone hollow fibers were dried at 30° C. by passage through a hot air drying column. The dried hollow fiber were immediately in-line coated with an ethyl cellulose polymer solution.

The ethyl cellulose solution was prepared by dissolving about 1% ethyl cellulose in isopropanol and was filtered through a 1.5 millimicron glass filter prior to application to the polysulfone. The dried hollow fiber was passed through the coating solution contained in a coating vessel and then dried in an air oven prior to being taken up on a winder. The resulting polysulfone hollow fiber composite membrane had an ethyl cellulose membrane material coating thickness of about 0.2 micron.

Modules were prepared for use and testing in the following experiment and examples by encapsulating the ends of a bundle of filaments of the above composite membrane about 8 inches long in epoxy tube sheet to separate the high pressure side from the low pressure side. Separate Modules were used in each run and they were tested at close to zero stage cut conditions. The individual modules had about 0.5 square foot of membrane surface area.

COMPARATIVE EXPERIMENT I

A series of air separations was carried out using four modules prepared as described above. Each module was tested for air separation at 100 psi and 25° C. using an untreated air stream containing about 5 to 10 ppm oil vapors. The average initial oxygen permeation rate for the four modules was 0.4 $ft^3(STP)/ft^2 \cdot psi \cdot day$ and the average $O_2/N_2$ selectivity was about 4. After 300 hours of continuous operation the oxygen permeation rate had decreased to 0.3 $ft^3(STP)/ft^2 \cdot psi \cdot day$ with no change in selectivity. Continued testing for about another 2000 hours showed no change in these values. The first 800 hours of operation with this module is represented by Curve C in the drawing. This is also the comparison run for Examples 1, 2, 3, 6, and 7.

The following examples serve to further illustrate this invention. The operations were arbitrarily stopped at the times indicated.

EXAMPLE 1

A module, prepared as described above, was tested for air separation at 100 psi and 25° C. using an untreated air stream containing about 5 to 10 ppm oil vapors. At initiation of the gas separation the initial oxygen permeation rate was about 0.39 $ft^3(STP)/ft^2 \cdot psi \cdot day$ and the $O_2/N_2$ selectivity was 4. After 400 hours of operation the oxygen permeation rate was about 0.32 $ft^3(STP)ft^2 \cdot psi \cdot day$ At this stage the module was removed and heated at 120° C. for one hour in an air convection oven, cooled to room temperature and air separation resumed. Upon resumption, the oxygen permeation rate had dramatically and unexpectedly increased to about 0.54 $ft^3(STP)/ft^2 \cdot psi \cdot day$. This represents an increase of about 40% above the initial oxygen permeation rate and about a 70% increase above the permeation rate before the module was treated by the process of this invention. This permeation rate declined over a period of about 75 hours and stabilized at a permeation rate of between about 0.38 to 0.4 $ft^3(STP)/ft^2 \cdot psi \cdot day$ for about another 900 hours of operation time. The module was again heated at 120° C. in the same manner, cooled and air separation resumed. Upon resumption, the oxygen permeation rate had again increased to about 0.53 $ft^3(STP)/ft^2 \cdot psi \cdot day$. It declined over another 2,100 hours of air separation to about 0.39 $ft^3(STP)/f^2 \cdot psi \cdot day$. The data shows the unexpected results and the ability to repeat the enhancement indefinitely by the process of this invention. The first 800 hours are represented by Curve A in the drawing.

EXAMPLE 2

A module, prepared as described above, was heated at 120° C. for one hour in an air convection oven, cooled to room temperature an tested for air separation at 100 psi and 25° C. using an untreated air stream containing about 5 to 10 ppm oil vapors. The initial oxygen permeation rate was 0.52 ft$^3$(STP)/ft$^2$·psi·day and the $O_2/N_2$ selectivity was 3.8. Over a period of about 575 hours the oxygen permeation rate gradually declined to about 0.4 $^3$(STP)/ft$^2$·psi·day and then remained at about this value for a total period of 800 hours of continuous operation. Curve B of the drawing represents this example.

It was noted that the oxygen permeation rate of the module of Example 1 stabilized at a permeability rate equal to slightly above its initial permeability rate after it had undergone the heat restoration treatment. The module of Example 2 started at a higher initial oxygen permeation rate and gradually declined and stabilized to about the same value at which the module of Example 1 had stabilized at after it had undergone the heat restoration treatment. The data in these examples indicated that the time of heat treatment did not appear to be important:, it could be performed initially or at any period after operation had begun; it also indicated that heat treatment by the process of this invention tends to retain the permeation rate initially attained, or even exceed it, during a separation operation. The module of the Comparative Experiment, however, stabilized at a permeation rate lower than its initial oxygen permeation rate and considerably lower than the stabilized values achieved in Examples 1 and 2. As previously indicated the data from this example was used in preparing the drawing.

EXAMPLE 3

A permeable membrane module was prepared by the general procedure described above. The module was heated at 120° C. for one hour in a pressurized shell with compressed air at a feed side pressure of 100 psig, zero psig bore side pressure and cooled to room temperature under ambient conditions. The flow stage cut was maintained at 100% during the heating. The module was tested, as described in Example 1, for air separation. The initial oxygen permeation rate was 0.47 ft$^3$(STP)/ft$^2$·psi·day with a selectivity factor of 3.7 between oxygen and nitrogen. After 800 hours of continuous operation, the permeation properties had become stable. At this time, the module had an oxygen permeability of 0.39 ft$^3$(STP)/ft$^2$·psi·day and a selectivity factor of 4. The data show that in the process of this invention pressurized hot gases can be used for treating the membranes.

EXAMPLE 4

A module, prepared as described above, was tested for air separation at about 20° C. and 100 psi using an untreated air stream containing about 5 to 10 ppm oil vapors. At initiation the oxygen permeation rate was 0.48 ft$^3$(STP)/ft$^2$·psi·day and the $O_2/N_2$ selectivity was about 4. After 336 hours of operation the oxygen permeation rate has dropped to 0.41 ft$^3$(STP)/ft$^2$·psi·day and the selectivity was about the same. At this stage the module was heated with steam at 100° C. and atmosphere pressure for one hour and allowed to cool to room temperature. On resumption of air separation the oxygen permeation rate had increased to 0.67 ft$^3$(STP)/ft$^2$·psi·day and the selectivity was 3.8. After an additional 512 hours of air separation the oxygen permeation rate was 0.64 ft$^3$(STP)/ft$^2$·psi·day and the selectivity was 3.9.

The data show that wet heat source, steam, is as effective as dry heat source, hot air, or convection oven heating in the process of this invention.

EXAMPLE 5

A gas separation module measuring 26 inches long and 5 inches in diameter was prepared by conventional procedures (U.S. Pat. Nos. 4,207,192 and 4,631,128) using composite hollow fiber membrane produced by essentially the same procedure described above. This module was laboratory tested for air separation at 23° C. utilizing compressed air at a pressure of about 100 psi, for a period of several hours and had an oxygen permeation rate of 0.57 ft$^3$(STP)/ft$^2$·psi·day and an $O_2/N_2$ selectivity of about 4. It was stored for about 5 weeks and the module was again tested for an additional 3 hours under the same conditions; it now showed an oxygen premeation rate of 0.51 ft$^3$(STP)/ft$^2$·psi·day and the same selectivity. One week later a pilot plant test was started which was run intermittently over about a six month period. During this period air separation was performed for over 2100 hours at the end of which time the permeation rate was about 0.38 ft$^3$(STP)/ft$^2$·psi·day and selectivity was about 4. The module was removed from the pilot plant unit and heated to 100° C. and maintained at this temperature for two hours using hot air circulation through the module at atmospheric pressure as the heating means. Ambient air at 100 psig replaced the heated air to cool the module and within one hour the permeation rate measured on the restored module was 0.51 ft$^3$(STP)/ft$^2$·psi·day and $O_2/N_2$ selectivity was about 4; these values remained essentially unchanged after about another 450 hours of operation. The data clearly establish the unexpected results achieved with this invention to enhance permeability.

EXAMPLE 6

A module, prepared as described above, was tested for air separation at 100 psi and 25° C. using an untreated air stream containing about 5 to 10 ppm oil vapors. At initiation of the gas separation the initial oxygen permeation rate was 0.4 ft$^3$(STP)/ft$^2$·psi·day and the $O_2:N_2$ selectivity was 3.8. After about 377 hours of operation the permeation rate was 0.30 ft$^3$(STP)/ft$^2$·psi·day and selectivity was about 4. The module was heated at 80° C. for one hour in a convection oven, cooled to room temperature and air separation resumed. At this stage the oxygen permeation rate increased to 0.41 ft$^3$(STP)/ft$^2$·psi·day. After about 930 hours additional operation the oxygen permeation rate was 0.3 ft$^3$(STP)/ft$^2$·psi·day and selectivity was about 4. The module was heat treated in a convection oven at 120° C. for one hour, cooled to room temperature and air separation resumed. After this heat treatment step the oxygen permeation rate increased to 0.44 ft$^3$(STP)/ft$^2$·psi·day and the selectivity was 3.7. After about another 2,000 hours of operation the oxygen permeation rate was 0.32 ft$^3$(STP)/ft$^2$·psi·day and selectivity was about 4. This example shows both the use of the broad temperature range suitable and the ability to repeat the heat treatment on the same module to restore its separation properties.

EXAMPLE 7

A module, prepared as described above, was tested for air separation at 100 psi and 25° C. using an untreated air stream containing about 5 to 10 ppm oil vapors. At initiation of the gas separation the initial oxygen permeation rate was 0.41 ft$^3$(STP)/ft$^2$·psi·day and the O$_2$/N$_2$ selectivity was about 4. After about 400 hours the oxygen permeation rate was about 0.31 ft$^3$(STP)/ft$^2$·psi·day. The module was heated one hour at 120° C. in a convection oven, cooled to room temperature and air separation resumed. At this stage oxygen permeation rate was 0.52 ft$^3$STP)/ft$^2$·psi·day and selectivity was 3.8.

What is claimed is:

1. A process for restoring the permeability characteristics of a gas separation membrane that has suffered degradation upon use in gas separation operations, without deleterious effect on the selectivity thereof, said membrane being capable of selectively permeating a more readily permeable component of a feed gas mixture containing said more readily permeable component and a less readily permeable component, said membrane having been dried to remove solvents employed in the preparation thereof prior to use in gas separation operations, said process consisting essentially of:
   (a) removing said gas separation membrane from service after a period of use in gas separation operations, during which time the permeability characteristics of the membrane, with respect to the more readily permeable component of the feed gas mixture, has suffered degradation as compared to said permeability characteristics of the membrane at the time it was placed in service due to the deposition of impurities thereon from said feed gas mixture during said period of use; and
   (b) heat treating said gas separation membrane at a temperature of from about 50° C. to about 140° C. to remove said deposited impurities therefrom, said heat treating being continued for a period of time on the order of from about 0.5 to about 3 hours, whereby the permeability characteristics of the membrane are restored without deleterious effect on the selectivity characteristics thereof.

2. A process as claimed in claim 1 wherein the temperature is from about 80° to about 140 ° C.

3. A process as claimed in claim 2 wherein said permeable membrane comprises a composite hollow fiber membrane.

4. A process as claimed in claim 3 wherein said composite hollow fiber membrane comprises a porous hollow fiber substrate coated with a membrane forming material.

5. A process as claimed in claim 4 wherein the porous hollow fiber substrate of said permeable membrane is polysulfone.

6. A process as claimed in claim 4 wherein the membrane-forming material of said permeable membrane is ethyl cellulose.

7. A process s claimed in claim 1 wherein the temperature is from about 100° C. to 125° C.

8. A process as claimed in claim 1 wherein said heat treating is performed at subatmospheric pressure.

9. A process as claimed in claim 1 wherein said heat treating is performed at superatmospheric pressure.

10. A permeable membrane produced by the process of claim 2.

11. A permeable membrane produced by the process of claim 3.

12. A permeable membrane produced by the process of claim 4.

13. A permeable membrane produced by the process of claim 3.

14. A permeable membrane produced by the process of claim 6.

15. A permeable membrane produced by the process of claim 8.

16. A permeable membrane produced by the process of claim 9.

* * * * *